Patented June 19, 1945

2,378,667

UNITED STATES PATENT OFFICE 2,378,667

PHENOL-FORMALDEHYDE RESIN AND POLYAMIDE COMPOSITION

Gordon T. Vaala, Wilmington, Del., assignor to E. I. du Pont de Nemours & Company, Wilmington, Del., a corporation of Delaware No Drawing. Application April 3, 1944, Serial No. 529,408

8 Claims. (Cl. 260—43)

This invention relates to polymeric materials and more particularly to improved fiber-forming polyamides and to products obtained therefrom.

This application is a continuation in part of my application Serial Number 309,898, filed December 18, 1939.

The incorporation into fiber-forming polyamides of various modifying agents, including resinous materials such as phenol-formaldehyde resin, has previously been proposed. There has been, however, no disclosure heretofore either of polyamide compositions comprising the selected resins disclosed herein, or of the specific properties described hereinafter which are imparted to the fiber-forming polyamide composition and which markedly enhance its utility.

This invention has as an object a new and useful composition of matter. A further object is a modified fiber-forming polyamide composition which is capable of being readily spun from melt, or otherwise formed, into filaments, bristles, films, ribbons, rods, tubes, etc., and the like having improved properties. A further object is the manufacture of articles of this kind, and particularly of bristles and films, which have greater water resistance and which are markedly stiffer than like articles previously obtained from fiber-forming polyamide compositions. Other objects will appear hereinafter.

The above objects are accomplished in the manner more fully pointed out hereinafter by incorporating with the fiber-forming polyamides certain phenol-aldehyde resins.

The polyamides used in the practice of this invention are the fiber-forming or synthetic linear super-polyamides described in U. S. Patents 2,071,250, 2,171,253 and 2,130,948. The most useful of these polymers for the present purpose are the polyamides which are obtainable from either polymerizable nonoaminomonocarboxylic acids or their amide-forming derivatives, from the reaction of diamines with dicarboxylic acids or amide-forming derivatives of dibasic carboxylic acids, or from mixtures of these types of polyamide-forming reactants. It is to be understood that the term "polyamide" includes linear polymers containing other groups, as for instance the ester-amide interpolymers obtained by reacting an hydroxy acid with a dibasic acid and a diamine. The amine groups in the polyamides form an integral part of the main chain of atoms in the polymers. Upon hydrolysis with mineral acids the polyamides revert to monomeric amide-forming reactants. For example, a polyamide derived from a diamine and dibasic acid yields on hydrolysis with hydrochloric acid the dibasic acid and the diamine hydrochloride. In the case of the amino acid polymers the amino derivatives are obtained in the form of the hydrochloride. These polyamides are remarkable in that they can be formed into filaments which upon application of tensile stress below the melting point, referred to as cold drawing, yield fibers exhibiting by characteristic X-ray patterns orientation along the fiber axis. Films and sheets, which may be obtained by extrusion from the molten polyamide, likewise exhibit orientation upon rolling or cold drawing.

I have discovered that fiber-forming compositions which yield filaments of useful pliability but of stiffness especially adapted to bristle manufacture, which filaments are not only water resistant but of sufficiently light color for textile fibers, and may be spun successfully without danger of infusibility of the polyamide composition at melt spinning temperatures, are obtained by mixing a fiber-forming polyamide with selected phenol-formaldehyde resins.

The phenol-formaldehyde resins suitable for carrying out my invention do not become infusible within a period of 1 to 3 hours at a temperature of 180 to 270° C. and are compatible with polyamides in all proportions. Such resins are obtained by reacting with formaldehyde a monohydric phenol containing at least one, but not more than two substitutable positions ortho and para to phenolic hydroxyl, the substituents on the remaining ortho and para positions being hydrocarbon radicals of at least 4 carbons attached to the phenol nucleus through a carbon atom carrying not more than one hydrogen atom. One method of imparting the desired properties of fusibility and compatibility with polyamides to these resins is to prepare them in the presence of an acid catalyst and with a formaldehyde to phenol molar ratio of less than 0.9:1.0, preferably between 0.5:1.0 and 0.85:1.0. Examples of suitable phenols are p-t-butyl phenol, p-hydroxydiphenyl, o-cyclohexylphenol, p-cyclohexylphenol, p-t-octyl phenol (p-di-isobutyl phenol), o-t-amyl phenol, p-t-amyl phenol, p-t-hexyl phenol, 2,4,-di-t-amyl phenol, etc.

It is to be observed that preparation of filaments, bristles, and films by extrusion from the molten polyamide-resin mixtures puts the phenol-formaldehyde resin to a severe test since the molten mixture is at a temperature considerably above those encountered in the preparation of phenolic resins or in the uses to which these resins are normally put.

The phenol-formaldehyde resins referred to above are compatible with the polyamides in all proportions. For most purposes quantities of the phenol-aldehyde resins ranging from 1 to 30 per cent, preferably 10 to 15 per cent, by weight of the polyamide are used to greatest advantage, the amount used depending on the phenol-aldehyde resin and the properties desired in the final product. The addition of the phenol-aldehyde resin usually causes a lowering of the softening point but does not materially lower the strength of the product. Unless used in large amounts, usually greater than 30%, the phenol-aldehyde modified polymers can be formed into filaments and films which can be oriented by cold drawing.

The new compositions of matter described herein are obtained by intimately mixing the preformed fiber-forming polyamide with the phenol-formaldehyde resin by fusion or in a mutual solvent, or by preparing the polyamide in the presence of the phenol-formaldehyde resin, as for instance by intimate mixing of the polyamide-forming reactants or compositions, e. g. the diamine-dicarboxylic acid salt, with the pulverized phenol-aldehyde resin and then proceeding with the polymerization of the polyamide-forming reactants or composition in the regular fashion. Usually no viscosity stabilizing agent is necessary since a polyamide polymerized to a high degree is desired. The addition of the phenol-aldehyde resin gives a final product with a melt viscosity of the same order of magnitude as for an unmodified polyamide that has been stabilized.

The following examples, in which parts are by weight, illustrate the preparation and application of the products of this invention.

Example I

An intimate mixture of 678 parts of hexamethylene diammonium adipate and 146 parts of a p-hydroxydiphenyl-formaldehyde resin was prepared and charged into a stainless steel autoclave. During a two-hour period the autoclave was heated to an internal temperature of 270° C., the pressure rising to 250 lbs./sq. in. During the next half-hour the pressure was reduced to atmospheric by permitting the water of the reaction to escape, following which the autoclave was maintained at an internal temperature of 270° C. for an additional hour. The modified polyamide thus obtained was then extruded from melt in bristle form. The bristle was yellow in color and softened at 200–230° C. It has a modulus of elasticity (measure of stiffness) of $0.37 \times 10^6$ when saturated with water, and absorbed 5.7% of its weight of water at saturation, as contrasted with values of $0.17 \times 10^6$ for modulus of elasticity and 7.6% for water absorption for unmodified polyhexamethylene adipamide bristle.

The resin used in this example was a commercial, non-heat hardening p-hydroxydiphenyl-formaldehyde resin (BR–254). There may be used instead with similar results a resin prepared by heating for 7 hours at 120–130° C. a mixture of 1 mole of p-hydroxydiphenyl and 0.7 mole of formaldehyde (used as the commercial aqueous solution) in the presence of a small amount of concentrated hydrochloric acid.

Example II

A mixture of 95 parts of polyhexamethylene adipamide and 5 parts of the p-hydroxydiphenyl-formaldehyde resin of Example I was heated for two hours at 275° C. under an atmosphere of carbon dioxide. The resulting modified polymer was homogeneous, light tan in color, and softened at 250–260° C. Bristles spun from the molten polymer, after cold drawing, had a modulus of elasticity of $0.30 \times 10^6$ and absorbed 7.4% of their weight of water at saturation, as contrasted with values of $0.17 \times 10^6$ for modulus and 7.6% for water absorption for unmodified polyhexamethylene adipamide.

Example III

An intimate mixture of 524 parts of hexamethylene diammonium adipate and 50 parts of a p-t-butylphenol-formaldehyde resin was prepared by ball-milling the ingredients. This mixture was charged into a stainless steel autoclave and during a two-hour period the autoclave was heated to an internal temperature of 270° C. while the pressure rose to 250 lbs./sq. in. During the next half-hour the pressure was reduced to atmospheric, following which the autoclave was maintained at an internal temperature of 270° C. for an additional hour. The modified polymer was then extruded in bristle form. The bristles were light yellow in color and softened at 245–250° C. They had a modulus of elasticity of $0.26 \times 10^6$ and absorbed 6.8% of their weight of water at saturation.

The resin used in this example was prepared by reacting for 12 hours at 100–110° C. with a small amount of concentrated hydrochloric acid as the catalyst, a mixture of one mole of p-t-butylphenol with 0.85 mole of formaldehyde, used as the commercial aqueous solution. The product is a light colored resin which remains fluid when heated at 240° C. for four hours. A colorless, likewise non-heat hardening resin, is obtained when 0.7 mole instead of 0.85 mole of formaldehyde is reacted with 1 mole of p-t-butylphenol under the same conditions.

Example IV

A mixture of 105 parts of hexamethylene diammonium adipate and 10 parts of an o-cyclohexylphenol formaldehyde resin was prepared and heated to 210° C. for two hours in a sealed tube. The mixture was then heated for two hours at 275° C. under an atmosphere of carbon dioxide. The final product was pinkish in color and softened at 245–250° C. It could be molded to a stiff film which absorbed 5.8% of its weight of water at saturation. Bristle prepared from the modified polymer had a stiffness of $0.31 \times 10^6$ at saturation.

The resin used in this example is prepared by heating at 90–100° C. for 12 hours a mixture of 1 mole of o-cyclohexylphenol with 0.7 mole of formaldehyde (as the 37% aqueous solution) in the presence of a small amount of concentrated hydrochloric acid. The resin remains fluid when heated at 240° C. for 4 hours. Instead of 0.7 mole of formaldehyde, there may be used 0.9 mole per mole of phenol, and even somewhat more.

Example V

Polymer prepared as described in Example I, consisting of approximately 80 parts of polyhexamethylene adipamide and 20 parts of the p-hydroxydiphenyl-formaldehyde resin of Example I was injection molded using a standard commercial injection machine and a standard commercial two-cavity comb die. At temperatures of about 260° C., the polymer molded to combs of good strength, stiffness, and appearance. The combs were light colored rather than dark as are most phenol-formaldehyde molded articles.

Example VI

A mixture of 60 parts of hexamethylene diammonium adipate, 40 parts of epsilon-aminocaprolactam, and 11 parts of p-hydroxydiphenyl-formaldehyde resin was heated at 250–260° C. for five hours in an autoclave. The product was then heated for two hours at 250–260° C. under an absolute pressure of about 2 mm. The final product was light colored and melted at 150–160° C. It absorbed 9.2% of its weight of water at saturation as compared with 14.5% for polyamide prepared in the same manner without the phenolic resin.

The resin of this example was prepared from p-hydroxy-diphenyl (1 mole), formaldehyde (0.7 mole) and hydrochloric acid catalyst as described in Example I.

Example VII

Five parts of a 20% solution in hot butyl alcohol of a polyamide derived from hexamethylene diamine, decamethylene diamine, adipic acid, and sebacic acid was mixed with three parts of a 20% solution of a commercial, non-heat hardening p-hydroxy-diphenyl-formaldehyde resin (XR-254) in hot butyl alcohol. The mixture was compatible. Films were prepared by flowing the mixture on a hot plate and removing the solvent by heating for one hour at 100° C.

The polyamides in the foregoing examples may be replaced by any of those mentioned in the patents previously referred to, and include polymers obtained from any combination of polyamide-forming ingredients, such as aliphatic or aromatic esters of dibasic acids and diamines, or amino acids or their lactams, anhydrides, or esters. Other suitable polyamides are for instance polytetramethylene sebacamide, polyhexamethylene adipamide, polydecamethylene adipamide, poly-m-phenylene sebacamide, 6-aminocaproic acid polymer, 9-amino-nonanoic acid polymer, and the inter-polyamide derived from 6-amino-caproic acid, hexamethylene diamine, and adipic acid.

Phenols in addition to those previously mentioned from which the phenol-formaldehyde resins may be derived are p-t-heptyl phenol, o-t-heptyl phenol, 2,4-di-t-butyl phenol etc.

Phenols of the special type described give, when condensed with aldehyde (e. g., formaldehyde) resins which are non-heat hardening and compatible with polyamides, provided the following procedural requirements are observed. It is necessary that the formaldehyde/phenol molar ratio be less than 0.9:1.0. Preferably, this ratio is between 0.5:1.0 and 0.85:1.0, and still more preferably between 0.6:1.0 and 0.8:1.0. The desirable ratio depends partly on the molecular weight of the phenol to be condensed, it being in general indicated to use less formaldehyde as the molecular weight of the phenol increases. Another requirement is that the condensation be carried out in the presence of an acidic catalyst e. g., hydrochloric acid, sulfuric acid, p-toluenesulfonic acid, oxalic acid, ammonium chloride, etc. Any suitable aldehyde may be used, e. g., acetaldehyde or butyraldehyde, but formaldehyde is preferred. The resins so prepared remain fusible on heating for 1 to 3 hours, and even much longer in most cases, at temperatures of 180 to 270° C. Several preparations of such resins have been illustrated. Non-heat hardening phenol/aldehyde resins are known in the art, see for example J. Ind. Eng. Chem. 33, 966–971, (1941), and some of them are commercial products such as the Bakelite Co. resins BR-254 and BR-4026.

The compositions of this invention may desirably contain for some purposes various modifying agents such as plasticizers, resins, cellulose derivatives, pigments, fillers, dyes and the like.

The present invention makes possible the preparation of modified fiber-forming polyamides of widely different properties. These products, depending upon their properties, are useful in many forms and for many purposes. Typical applications are yarns, fabrics, bristles, rods, tubes, films, sheets, molded articles, electrical insulation (e. g., for wires used as windings in electric motors), and coating compositions.

The modified polyamides described herein are markedly superior to the unmodified polyamides from the standpoints of stiffness and water resistance, these properties being particularly desirable in bristles for use in tooth brushes. These properties are also important in connection with certain film uses, e. g. photographic films, since they permit the use of thinner films than is otherwise possible. These properties also enhance the utility of the polymer in molding, particularly injection molding. A further advantage is that the phenol-aldehyde ingredient is a comparatively low cost material which means that the modified polyamides can be prepared at lower cost than unmodified polyamides.

In addition to the uses already mentioned, polyamides modified according to the process of this invention are, like the unmodified polyamides from which they are derived, useful in such applications as valve parts (e. g., discs, seats) for use with oxygen, air, water, etc.; gaskets; battery containers; knitting and weaving machine parts (bobbins, shuttles, thread guides, etc.); dentures (base, artificial teeth, reinforcement for teeth, etc.); heat resistant handles for utensils, surgical instruments, radiator valves, etc.; sterilizable, unbreakable utensils; molded solid sheets, etc.

As many apparently widely different embodiments of this invention may be made without departing from the spirit and scope thereof, it is to be understood that I do not limit myself to the specific embodiments thereof except as defined in the appended claims.

I claim:

1. A composition of matter comprising a fiber-forming synthetic linear polyamide and a compatible phenol-formaldehyde resin which does not become infusible within a period of 1 to 3 hours at a temperature of 180° to 270° C., said phenol-formaldehyde resin being present in an amount of from 1% to 30% by weight of said polyamide and being derived from a monohydric phenol containing at least one but not more than two substitutable positions ortho and para to phenolic hydroxyl, the substituents on the remaining ortho and para positions being hydrocarbon radicals of at least 4 carbons attached to the phenol nucleus through a carbon atom carrying not more than one hydrogen atom, and said polyamide being the reaction product of a linear polymer-forming composition comprising reacting materials selected from at least one of the groups consisting of (a) monoaminomonocarboxylic acid, and (b) mixtures of diamines and dibasic carboxylic acids, said phenol-formaldehyde resin being the condensation product in the presence of an acid catalyst of formaldehyde and said phenol in a molar ratio of formaldehyde to phenol less than 0.9:1.0.

2. The composition of matter set forth in claim 1 in which said substituents comprise an aliphatic tertiary hydrocarbon radical in the para position to the phenolic hydroxyl.

3. The composition of matter set forth in claim 1 in which said phenol is o-cyclohexyl phenol.

4. The composition of matter set forth in claim 1 in which said phenol is p-tertiary butyl phenol.

5. The composition of matter set forth in claim 1 in which said phenol is p-hydroxydiphenyl.

6. The composition set forth in claim 1 in which said polyamide is polyhexamethylene adipamide.

7. A process for preparing polyamide compositions of improved water resistance which comprises heating linear polyamide-forming material under polymerizing conditions in the presence of a phenol-formaldehyde resin which does not become infusible within a period of from 1 to 3 hours at a temperature of 180° to 270° C., and which is derived from a monohydric phenol containing at least one but not more than two substitutable positions ortho and para to phenolic hydroxyl, the substituents on the remaining ortho and para positions being hydrocarbon radicals of at least 4 carbons attached to the phenol nucleus through a carbon atom carrying not more than one hydrogen atom, said polyamide-forming material being selected from one of the groups consisting of (a) monoaminomonocarboxylic acid, and (b) mixtures of diamines and dibasic carboxylic acids, said phenol-formaldehyde resin being the condensation product in the presence of an acid catalyst of formaldehyde and said phenol in a molar ratio of formaldehyde to phenol less than 0.9:1.0.

8. The process set forth in claim 7 in which said polyamide-forming material comprises hexamethylenediamine and adipic acid.

GORDON T. VAALA.